US012680976B2

(12) United States Patent
Diez Garcia et al.

(10) Patent No.: US 12,680,976 B2
(45) Date of Patent: Jul. 14, 2026

(54) DEVICE FOR MEASURING ELECTRICAL CONDUCTIVITY IN LIQUID MEDIA

(71) Applicant: CEBI ELECTROMECHANICAL COMPONENTS SPAIN, S.A., Villatuerta (ES)

(72) Inventors: Sergio Diez Garcia, Villatuerta (ES); Jose Luis Landatxe Zugarramurdi, Villatuerta (ES); Enrique Bretón Cristóbal, Villatuerta (ES); Jorge Machín Mindán, Villatuerta (ES); Javier Garcia Izaguirre, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 183 days.

(21) Appl. No.: 18/795,670

(22) Filed: Aug. 6, 2024

(65) Prior Publication Data

US 2025/0067695 A1    Feb. 27, 2025

(30) Foreign Application Priority Data

Aug. 24, 2023    (ES) ............................... ES202330708

(51) Int. Cl.
*G01N 27/07*    (2006.01)
(52) U.S. Cl.
CPC .................................... *G01N 27/07* (2013.01)
(58) Field of Classification Search
USPC ........................................................ 324/693
See application file for complete search history.

(56) References Cited

U.S. PATENT DOCUMENTS

| | | | |
|---|---|---|---|
| 4,227,151 A | 10/1980 | Ellis et al. | |
| 4,683,435 A | 7/1987 | Blades | |
| 2008/0262796 A1* | 10/2008 | Rufer ...................... G01F 25/10 | |
| | | | 702/184 |
| 2018/0031505 A1 | 2/2018 | Diez et al. | |

FOREIGN PATENT DOCUMENTS

ES    2684611 A1    10/2018

OTHER PUBLICATIONS

Search Report issued in corresponding Spanish Patent Application No. 202330708, 5 pages, Oct. 3, 2018.

* cited by examiner

*Primary Examiner* — Farhana A Hoque
(74) *Attorney, Agent, or Firm* — LUCAS & MERCANTI, LLP

(57)    ABSTRACT

A device for measuring electrical conductivity comprising: electrodes (700a, 700b); a current source (100) configured to inject an electrical current into a medium (600); a switching block (200) configured to produce a current flow through the medium (600) from the first electrode (700a) to the second electrode (700b) or from the second electrode (700b) to the first electrode (700a); a sensor block (300) connected to the first electrode (700a) and/or the second electrode (700b), configured to amplify an electrical magnitude of the medium (600) generated in response to the current flow in the medium (600); and a feedback block (400) configured to connect the sensor block (300) to the current source (100).

15 Claims, 7 Drawing Sheets

100a2

100a3

DEVICE FOR MEASURING ELECTRICAL CONDUCTIVITY IN LIQUID MEDIA

CROSS-REFERENCE TO RELATED APPLICATION

This application claims priority of Spanish Application No. P202330708 filed Aug. 24, 2023 the contents of which is incorporated herein by reference.

TECHNICAL FIELD

The subject matter of the present invention is a device for measuring electrical conductivity, especially suitable for measuring the electrical conductivity of a liquid medium.

The device for measuring electrical conductivity, which is the subject matter of the present invention, allows the variation in the electrical conductivity of a liquid medium to be measured and detected, with high resolution, for a very wide range of conductivity values, minimising or avoiding the problems associated with the degradation of the measurement electrodes.

The device for measuring electrical conductivity, which is the subject matter of the present invention, is applicable in the industry dedicated to the design and manufacture of electronic measurement devices and, more specifically, devices for measuring the conductivity of liquid media.

STATE OF THE ART

In the field of devices for measuring electrical conductivity, the most common technique consists of inserting or immersing two electrodes in a medium (solid or liquid) and circulating a certain intensity of direct current (DC) between said electrodes, subsequently measuring the voltage drop between said electrodes in order to infer the electrical conductivity of the medium.

A problem associated with the technique mentioned in the previous paragraph is that, when a direct current intensity is applied between the electrodes, when they are submerged in a liquid medium, electrochemical reactions frequently occur between the electrodes and the liquid medium, causing rapid degradation of the electrodes.

One solution to the problem of electrode degradation is to use alternating current (AC) instead of direct current. Document ES 2684611 A1 describes a device for detecting water in diesel filters. This device comprises two electrodes configured to be immersed in a liquid medium. The device comprises a direct current source designed using the current mirror technique. The device further comprises two switches configured to open and close alternately, such that one of the two switches is open (preventing the passage of electric current) and another of the switches is closed (allowing the passage of electric current) at all times, such that a current flow takes place between the electrodes in one direction or the other (AC current) depending on which of the switches is open and which of the switches is closed at any given time.

Although the flow of alternating current between the electrodes enables the problem of electrode degradation to be solved, there is an additional drawback associated with measuring conductivity in a medium, especially in a liquid medium.

In fact, when the intention is to infer the electrical conductivity of the medium by injecting it with a direct current and measuring the voltage drop that occurs between electrodes, there is a non-linear response that resembles an exponential curve, such that for reduced values of conductivity, the variation response of the voltage drop between electrodes to a variation in conductivity is very large.

By digitizing this voltage drop signal using an analogue-digital converter (ADC), a very good resolution is obtained since said ADC converter perfectly discriminates between the two voltage drop values (and therefore between the two conductivity values) when said values are sufficiently far from each other (if the ADC converter has a sensitivity value greater than the difference in voltage drop value).

However, due to the fact that this response resembles an exponential curve, for high values of the conductivity of the medium, the variation response of the voltage drop between electrodes to a variation in conductivity is very small. In general, the greater the electrical conductivity of the medium, the increases in the electrical conductivity of the medium lead to increasingly smaller variations in the voltage drop between the electrodes.

Therefore, it may be the case that the difference in the voltage drop between the electrodes due to a variation in the electrical conductivity of the medium is below the sensitivity of the ADC converter, giving rise to a sensor device that is no longer useful (it does not have sufficient resolution) to measure the variation in the electrical conductivity of the medium.

SUMMARY OF THE INVENTION

In order to solve the aforementioned drawbacks, the present invention relates to a device for measuring electrical conductivity.

The device for measuring electrical conductivity, which is the subject matter of the present invention, comprises:

- a first electrode and a second electrode, both electrodes being configured to be introduced into a medium (preferably a liquid medium) for measuring the electrical conductivity of said medium;
- a current source configured to inject an electrical current into the medium, and;
- a switching block configured to produce a flow of current through the medium from the first electrode to the second electrode or from the second electrode to the first electrode.

In a novel manner, the device for measuring conductivity, which is the subject matter of the present invention additionally comprises:

- a sensor block connected to the first electrode and/or the second electrode, configured to amplify an electrical magnitude of the medium generated in response to the current flow in the medium, and;
- a feedback block configured to connect the sensor block to the current source.

Therefore, this device for measuring electrical conductivity offers a native response (before digitisation and processing) that varies linearly with the conductivity, that is, for the same variation in conductivity, the change induced in the output voltage of the system will be the same regardless of the conductivity range of the medium.

By digitizing this signal using an ADC converter, the resolution in terms of conductivity will be the same in any conductivity range.

The current source may comprise a first operational amplifier (U1) or a current mirror.

The device is configured to, via feedback to the current source of the amplified electrical magnitude, inject an electrical current into the medium the current intensity value of which depends on the electrical conductivity of the medium.

Using the device described, a reference signal is introduced to the sensor block that, so to speak, is subtracted from the internal response of the system. The difference is amplified by the sensor block (which comprises a second operational amplifier (U2)) and is fed back to the adjustable current source, adjusting it automatically to keep the voltage between the medium electrodes constant and ensuring that the difference between signal and setpoint becomes zero for any conductivity value that the medium has. Since, in order to achieve this, the output voltage produced by the sensor block will have to be different as the conductivity varies, said output voltage of the sensor block is used as the output of the system, which is linear, transferring the non-linearity to the evolution of the electrode current depending on the conductivity being measured. By varying the output voltage linearly with the conductivity, the problem of lack of resolution in the high conductivity ranges suffered by those embodiments in which the medium is polarised with a constant current is resolved.

The current source can be an alternating current source, thus avoiding degradation of the electrodes.

However, according to the present invention, the current source is preferably a direct current source.

The current source may be configured to inject current into the medium through the first electrode, and wherein the second electrode is connected to ground through a decoupling capacitor (C1). In this way, an alternating current is achieved between the electrodes via the switching block and the decoupling capacitor (C1).

Preferably, the switching block comprises a switch(S) (which may be a transistor), configured to be controlled by a microcontroller, and wherein said switch(S) is connected to ground.

The switch(S) can be connected to ground through a discharge resistor (Rdisch).

According to a first embodiment of the device for measuring conductivity, which is the subject matter of the present invention, the switch(S) of the switching block is configured to:

adopt a first configuration, in which the switch(S) establishes a connection between the current source and the first electrode, and;

adopt a second configuration, in which the switch disconnects the first electrode from the current source and establishes a connection between the first electrode and ground.

Alternatively, according to a second embodiment of the device for measuring electrical conductivity, which is the subject matter of the present invention, the switch(S) is connected to ground in parallel to the medium and in series with a discharge resistor (Rdisch) of lower value to the equivalent resistor (Rmedium) of the medium.

In this second embodiment, the switch(S) can be made using a MOSFET type transistor.

Preferably, in this second embodiment of the invention, the sensor block has a resistive voltage divider connected to its input, formed by two resistors (Rdiv1, Rdiv2), such that a resistance is imposed at the input of the sensor block that is proportional to a supply voltage (VDC) of the current source.

Also preferably, in this second embodiment of the invention, the device for measuring electrical conductivity comprises a filter block connected between the sensor block and the feedback block. This filter block is configured to stabilise the voltage at the output of the sensor block.

Preferably, the filter block comprises an RC filter.

Additionally, the filter block may comprise at least a first RC branch in parallel with the RC filter.

Also according to the second embodiment of the device for measuring electrical conductivity, the sensor block may comprise a non-inverting amplification stage formed by an operational amplifier (second operational amplifier (U2)) in parallel with a compensation capacitor.

In the second embodiment of the device for measuring conductivity, which is the subject matter of the present invention, different types of current sources can be implemented.

For example, the current source may comprise a first operational amplifier (U1) connected to a first transistor (Q1) through a polarisation resistor (Rbase), wherein the non-inverting input of the first operational amplifier (U1) is connected to the feedback block.

Alternatively, the current source may comprise a current mirror.

In the second embodiment of the device for measuring electrical conductivity, which is the subject matter of the present invention, the switching block may comprise a parallel resistor (Rpar) connected in parallel to the switch (S).

Using this parallel resistor (Rpar), it is possible to increase the range of conductivity values that the device is capable of measuring.

Alternatively to this parallel resistor (Rpar), a current source comprising a second current range switching module can be used. By means of this second current range switch, it is also possible to expand the range of conductivity values that the device of the invention is capable of measuring. Both elements, the parallel resistor (Rpar) and second range switch, can be used alternatively or simultaneously.

BRIEF DESCRIPTION OF THE FIGURES

As part of the explanation of at least one embodiment of the invention, the following figures have been included.

DETAILED DESCRIPTION OF THE INVENTION

Figure 1:
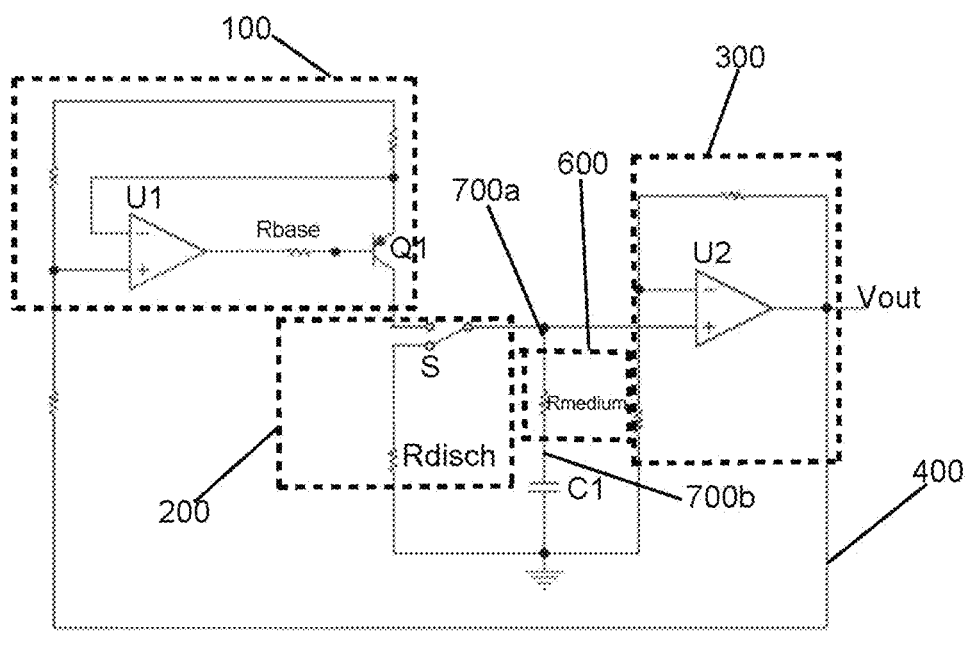
FIG. 1 shows a schematic view of the circuit for measuring conductivity, according to a first embodiment of the device for measuring electrical conductivity, which is the subject matter of the present invention.

The present invention relates, as mentioned above, to a device for measuring electrical conductivity.

The device comprises a circuit for measuring the electrical conductivity of a medium (600), wherein said circuit varies in some of its features and elements according to the different embodiments of the device of the invention.

The medium (600) in which electrical conductivity is measured via the device of the invention is typically a liquid medium.

In the circuits of the Figures, the medium (600) is represented by its equivalent resistor (Rmedium). The value of the conductivity of the medium (600) that is to be measured via the device which is the subject matter of the present invention is the inverse of the equivalent resistor of the medium (1/Rmedium).

The device comprises a current source (100) configured to inject current into the medium (600) in which the electrical conductivity is intended to be measured.

The device further comprises a switching block (200), configured to connect and disconnect the current source (100) to and from the medium (600).

The device comprises a conductivity sensor block (300), configured to receive and amplify an electrical magnitude of the medium (600) in response to the injection of electric current into the medium (600) by the current source (100).

The sensor block (300) is configured to connect to an analogue-digital converter (ADC) (not shown in the Figures) for digitizing the amplified electrical magnitude of the medium (600).

The device comprises a feedback block (400), which comprises a feedback loop (or line) that connects the output of the sensor block (300) to the current source (100).

The device may also comprise a filter block (500) and/or stabilisation of the electrical magnitude of the medium (600), configured to stabilise the measurement of the electrical magnitude of the medium (600) measured by the sensor block (300).

According to the present invention, the device comprises two electrodes (700a, 700b) configured to be arranged immersed in the medium (600). The device is configured to inject an electrical current into the medium (600) via the current source (100), through a first electrode (700a). The second electrode (700b) is grounded through a decoupling capacitor (C1).

The switching block (200) comprises a switch(S) (or a transistor), configured to be controlled by a microcontroller (not shown in the Figures), which allows the opening and closing pulses to be controlled, as well as the opening time of said switch(S). The switch(S) has one of its poles connected to ground (for example, through a discharge resistor (Rdisch)).

FIG. 1 shows a diagram of an electrical circuit for measuring the electrical conductivity of the medium (600), according to a first embodiment of the device of the invention.

In this first embodiment of the device, the current source (100) is based on a first operational amplifier (U1) connected to a first transistor (Q1) (for example, of the BJT type) via a polarisation resistor (Rbase). A control signal is connected to the non-inverting input of the first operational amplifier (U1), proportional to the output voltage of the device, Vout.

Due to the fact that the sensor block (300) comprises a second operational amplifier (U2), which produces at its output the output voltage, Vout, of the device (which is the result of amplifying the electrical magnitude of the medium (600)), this output voltage, Vout, is proportional to the voltage drop between the measuring electrodes (700a, 700b), which, taking into account the configuration of the circuit, causes the output voltage, Vout, to decrease for increasing conductivity values.

Thus, via the feedback block (400), a control signal is connected to the current source (100) that is proportional to the voltage drop between the electrodes (700a, 700b) with which and taking into account the operation of said source (100), causes said current to increase for increasing conductivity values.

In this first embodiment of the conductivity measurement device, the switch(S) of the switching block (200) can adopt a first configuration, in which the switch(S) establishes a connection between the current source (100) and the first electrode (700a), such that the current source (100) injects electric current into the medium (600), and; a second configuration, in which the switch disconnects the first electrode (700a) from the current source (100) and connects the first electrode (700a) to ground (for example, through the aforementioned discharge resistor (Rdisch)).

Thus, when the switch(S) of the switching block (200) is in the second configuration, the current source (100) no longer injects current into the medium (600), and a discharge current is produced from the medium (600) to ground through the switch(S) (and through the discharge resistor (Rdisch), if present).

In this way, by alternating at regular time intervals the switch(S) controlled by the microprocessor between its two configurations, an alternating current is produced in the medium (600) due to the decoupling capacitor (C1).

Figure 2:
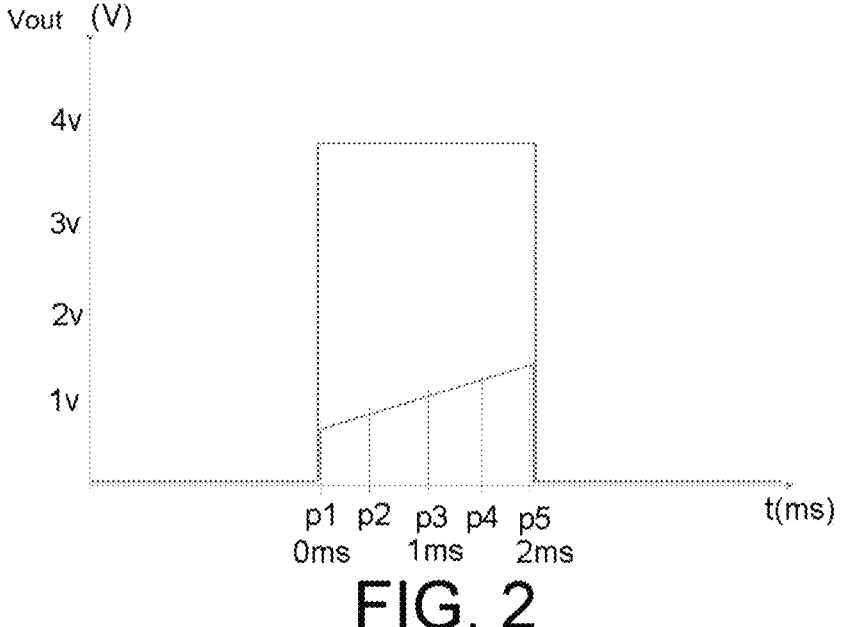
FIG. 2 shows a diagram of sampling the conductivity of the medium, during the period of time of current injection into the medium.

A schematic diagram is shown in FIG. 2 of a time interval (which, by way of example, is shown as an interval with a duration of 2 ms) in which electrical current is injected into the medium (600) via the current source (100) of the device.

The diagram in FIG. 2 shows, as an example, that 5 samples (p1, p2, p3, p4, p5), taken at intervals of 0.5 ms, are taken from the measurement of the electrical magnitude carried out by the device of the invention. These samples can be taken using equipment that has conductivity measurement software installed, wherein said equipment is connected to the device of the invention (typically through an ADC converter).

In this way, an operation sequence easily implemented by the microcontroller could consist, for example, of piloting the switch(S) by means of a 0-1 logic signal established according to a square wave pattern, in which each current injection interval is followed by another discharge interval of similar duration, the current injection-sampling-discharge cycle repeating uninterruptedly, and consequently the variations in conductivity of the medium (600) are reflected with great immediacy in the output signal.

Figure 3:
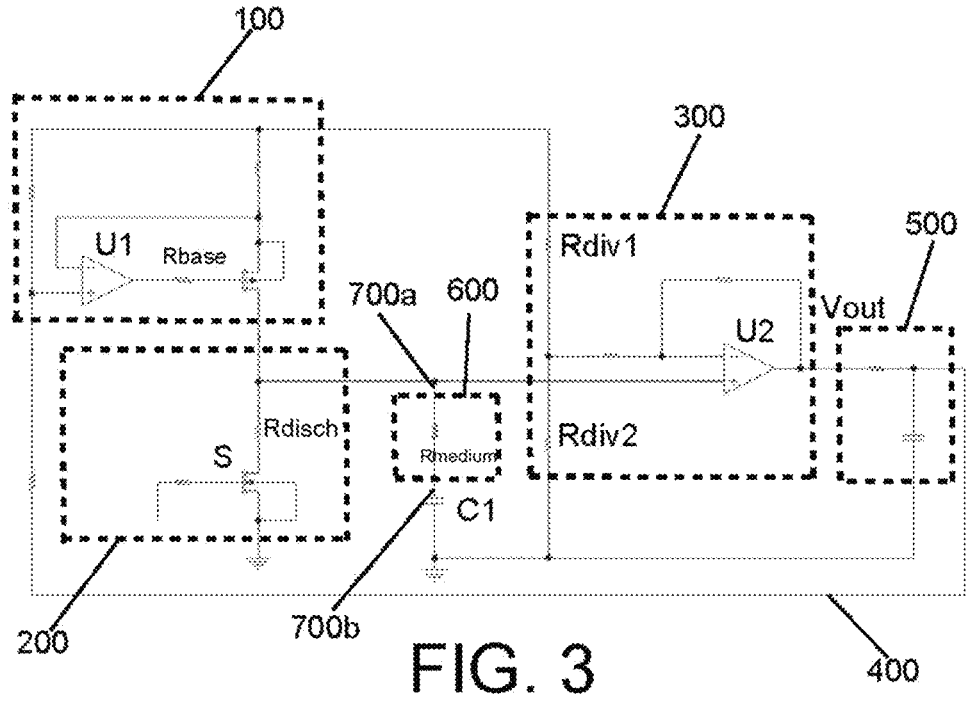
FIG. 3 shows a diagram of an electrical circuit for measuring the electrical conductivity of the medium, according to a first variant of a second embodiment of the device of the invention.

FIG. 3 shows a diagram of an electrical circuit for measuring the electrical conductivity of the medium (600), according to a first variant of a second embodiment of the device of the invention.

In this second embodiment of the device for measuring conductivity, the switch(S) of the switching block (200) is a MOSFET type transistor that is connected in parallel to the medium (600) and is connected to ground through a branch that comprises a discharge resistor (Rdisch) of very low value compared to the equivalent resistor (Rmedium) of the medium (600).

Thus, in this second embodiment, when the switch(S) of the switching block (200) is in the first configuration, the current generated by the current source (100) is directed to the medium (600) through the first electrode (700a) and, when the switch(S) of the switching block (200) is in the second configuration, the switch(S) conducts the current generated by the current source (100) and also allows a discharge current to be directed from the medium (600) to the switch(S), discharging the decoupling capacitor (C1).

In this way, due to the decoupling capacitor (C1) and the switched switch(S) controlled by the microcontroller, an alternating current is produced in the medium (600).

In this second embodiment, a resistive voltage divider, formed by two resistors (Rdiv1, Rdiv2), has been included at the input of the sensor block (300). In this way, a reference voltage proportional to the supply voltage (VDC) of the current source (100) is imposed at the input of the sensor block (300).

Due to the fact that the first electrode (700a) is connected to the non-inverting input of the second operational amplifier (U2) of the sensor block (300), and due to the gain of the second operational amplifier (U2) of the sensor block (300), said reference voltage is transferred to the non-inverting input of the second operational amplifier (U2), or what is the same, to the node to which the electrodes (700a, 700b) are connected. This node will remain at that constant voltage in the defined conductivity range for which the system has been sized, since simultaneously and automatically a control voltage will be imposed on the current source (100) that will result in an output current that is inversely proportional to the conductivity of the medium (600), which at each moment is necessary to maintain both inputs of the second operational amplifier (U2) at the reference voltage.

In this second embodiment there is a filter block (500) connected between the sensor block (300) and the feedback block (400).

The second form of embodiment of the device for measuring conductivity allows different variants, each of them referring to various aspects of each of the blocks of the measurement circuit. These different variants can be combined with the measurement circuit previously described for this second embodiment of the device for measuring conductivity.

Thus, according to the first variant (represented in FIG. 3) of the second embodiment, the filter block (500) consists of an RC filter configured to stabilise the voltage at the output of the sensor block (300), avoiding the oscillations.

In the first variant of the second embodiment of the device, the current source (100) is based on a first operational amplifier (U1) connected to a first transistor (Q1) (for example, of the MOSFET type) via a polarisation resistor (Rbase). A control signal is connected to the non-inverting input of the first operational amplifier (U1), proportional to the output voltage, Vout, of the device, which in turn is proportional to the voltage drop between the measurement electrodes (700a, 700b).

Figure 4:
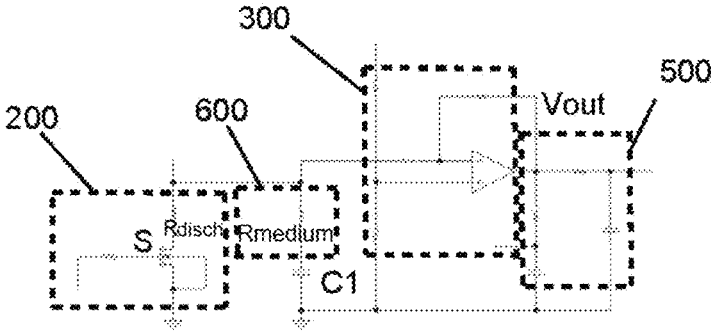
FIG. 4 shows a detail of an electrical circuit for measuring the electrical conductivity of the medium, according to a second variant of the second embodiment of the device of the invention.

FIG. 4 shows a diagram of an electrical circuit for measuring the electrical conductivity of the medium (600), according to a second variant of the second embodiment of the device of the invention.

In the circuit for measuring conductivity shown in FIG. 4, the representation of the current source (100) and the feedback block (400) has been omitted.

As can be seen, in this second variant of the second embodiment of the device for measuring conductivity, the filter block (500) comprises an additional first RC branch in parallel with the RC filter of the first variant.

Figure 5:
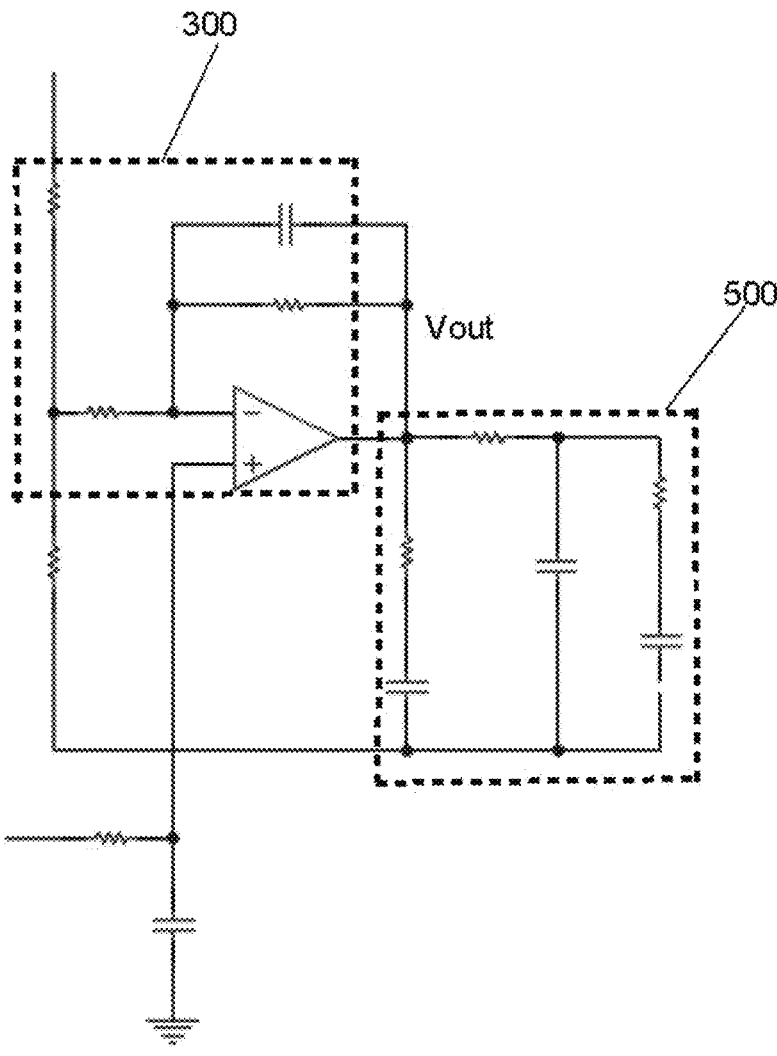
FIG. 5 shows a detailed view of an electrical circuit for measuring the electrical conductivity of the medium, according to a third variant of the second embodiment of the device of the invention.

FIG. 5 shows a diagram of an electrical circuit for measuring the electrical conductivity of the medium (600), according to a third variant of the second embodiment of the device of the invention.

In the circuit for measuring conductivity represented in FIG. 5, only the sensor block (300) and the filter block (500) have been represented in detail.

As can be seen, in this third variant of the second embodiment of the device for measuring conductivity, the filter block (500) comprises an additional first RC branch and an additional second RC branch, both in parallel with the filter RC of the first variant.

Likewise, as can be seen, in this third variant of the second embodiment of the device for measuring conductivity, the sensor block (300) comprises a non-inverting amplification step, due to the arrangement of a compensation capacitor in parallel with the second operational amplifier (U2).

Figure 6:
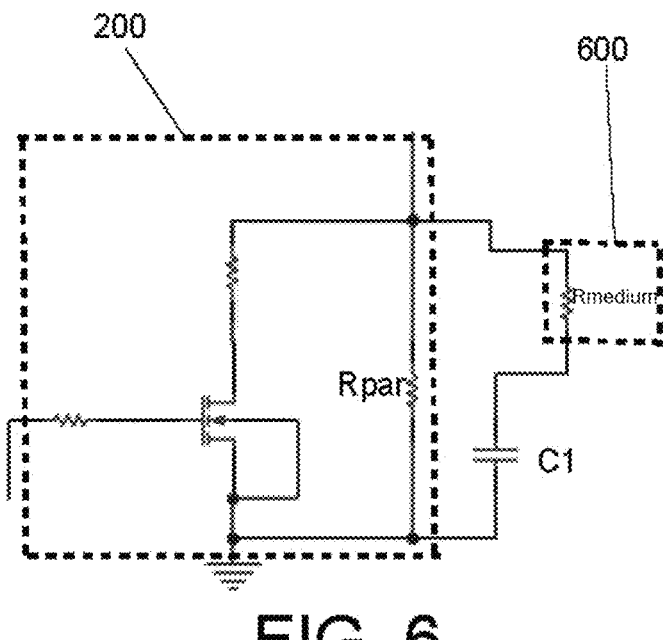
FIG. 6 shows a detailed view of an electrical circuit for measuring the electrical conductivity of the medium, according to a fourth variant of the second embodiment of the device of the invention.

FIG. 6 shows a diagram of an electrical circuit for measuring the electrical conductivity of the medium (600), according to a fourth variant of the second embodiment of the device of the invention.

In the circuit for measuring conductivity shown in FIG. 6, only the switching block (200) has been shown in detail.

As can be seen, in this fourth variant of the second embodiment of the device for measuring conductivity, the switching block (200) comprises a parallel resistor (Rpar) connected in parallel to the switch(S).

This parallel resistor (Rpar) increases the range of conductivity values of the medium (600) that can be measured by the measuring device.

The second embodiment of the device for measuring conductivity allows a variety of different current sources (100) to be used.

FIG. 7a, FIG. 7b, FIG. 7c and FIG. 7d show different types of current sources (100) that can be used in the device for measuring conductivity, according to the second embodiment thereof.

Figure 7A:
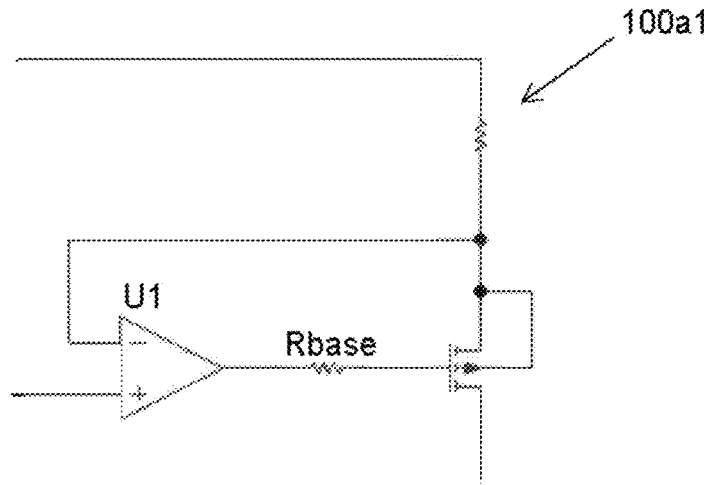
FIG. 7a shows a first source type that can be used in the device for measuring conductivity, according to the second embodiment thereof.

FIG. 7a shows a first type (100a1) of current source (100) that is based on the use of a first operational amplifier (U1).

In the first variant (shown in FIG. 3) of this second embodiment of the device for measuring conductivity, the current source (100) is shown according to this first embodiment (100a1) shown in FIG. 7a.

Figure 7B:
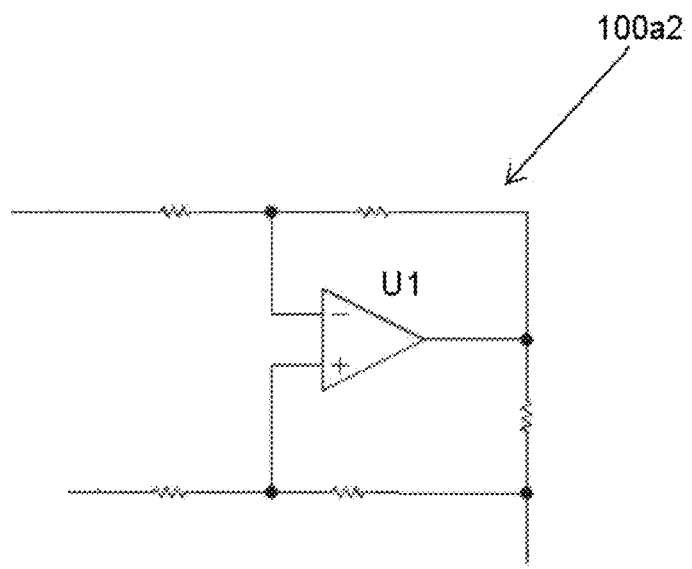
FIG. 7b shows a second source type that can be used in the device for measuring conductivity, according to the second embodiment thereof.

FIG. 7b shows a second type (100a2) of current source (100) that is also based on the use of a first operational amplifier (U1). In this case and due to the specific manner of operation of this source (100), the output voltage of the system, Vout, will increase for increasing conductivity values.

Figure 7C:
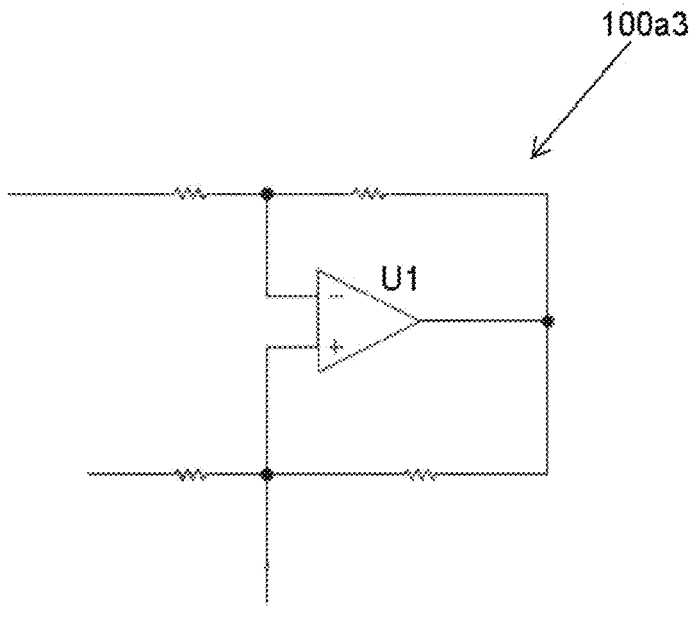
FIG. 7c shows a third source type that can be used in the device for measuring conductivity, according to the second embodiment thereof.

FIG. 7c shows a third type (100a3) of current source (100) that is also based on the use of a first operational amplifier (U1). As in case 7b, the output voltage of the system, Vout, will increase for increasing conductivity values.

Figures 7D, 8:
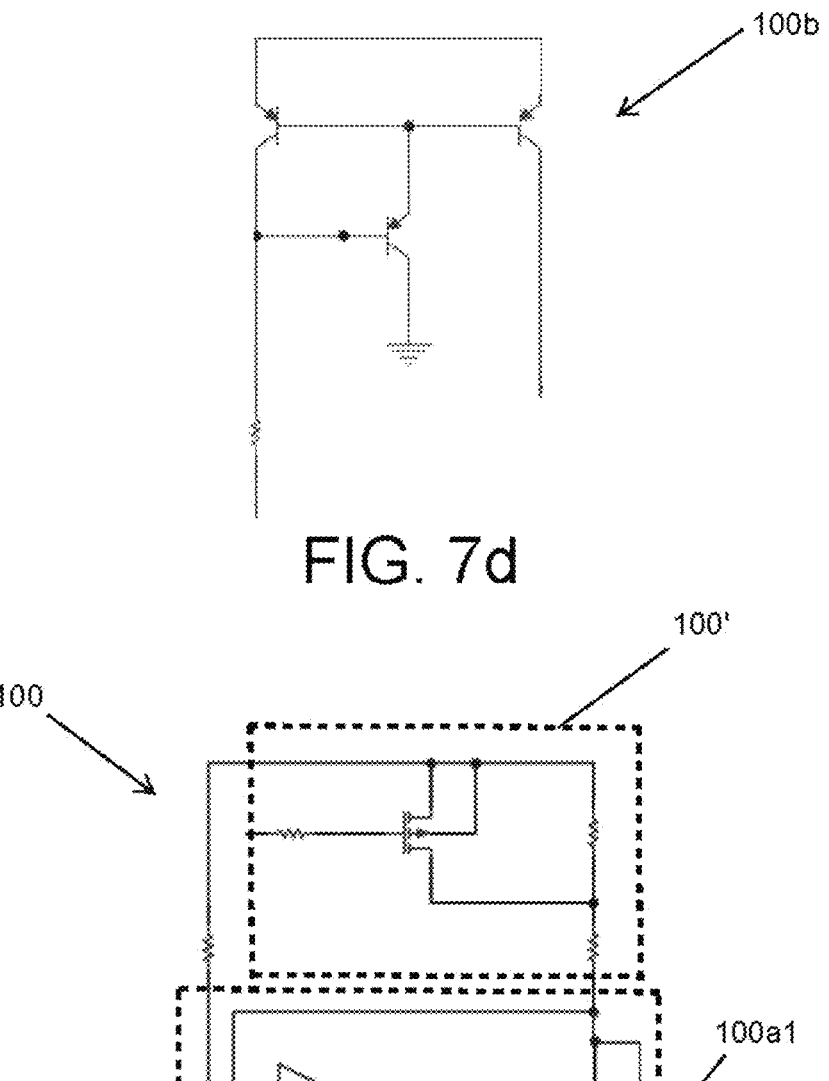
FIG. 7d shows a fourth source type that can be used in the device for measuring conductivity, according to the second embodiment thereof.
FIG. 8 shows a diagram of an electrical circuit for measuring the electrical conductivity of the medium, according to a fifth variant of the second embodiment of the device of the invention.

FIG. 7d shows a fourth type (100b) of current source (100) that is based on the use of a current mirror.

FIG. 8 shows a diagram of an electrical circuit for measuring the electrical conductivity of the medium (600), according to a fifth variant of the second embodiment of the device of the invention.

In the circuit for measuring conductivity shown in FIG. 8, only the current source (100) has been shown in detail.

As can be seen, in this fifth variant of the second embodiment of the device for measuring conductivity, the current source (100) comprises a module according to the first type (100a1) of current source (100), as well as a second current range switching module (100').

Figure 9:
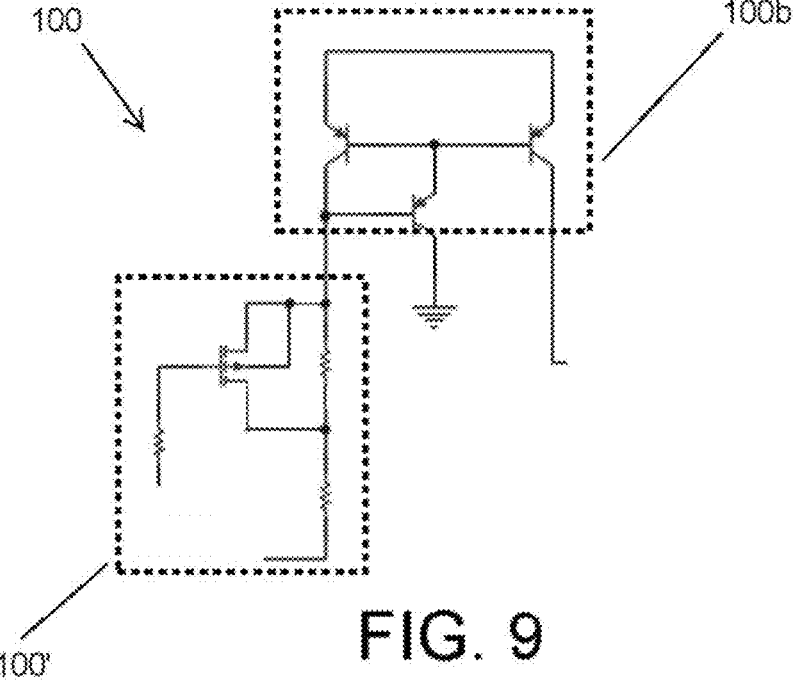
FIG. 9 shows a diagram of an electrical circuit for measuring the electrical conductivity of the medium, according to a sixth variant of the second embodiment of the device of the invention.

FIG. 9 shows a diagram of an electrical circuit for measuring the electrical conductivity of the medium (600), according to a sixth variant of the second embodiment of the device of the invention.

In the circuit for measuring conductivity shown in FIG. 9, only the current source (100) has been shown in detail.

As can be seen, in this sixth variant of the second embodiment of the device for measuring conductivity, the current source (100) comprises a module according to the fourth type (100b) of current source (100), as well as a second current range switching module (100').

The use, within the current source (100), of a second current range switching module (100') according to the fifth variant and the sixth variant of the second embodiment of the device for measuring conductivity of the present invention, increases the range of conductivity values of the medium (600) that can be measured by the measuring device.

Figure 10:
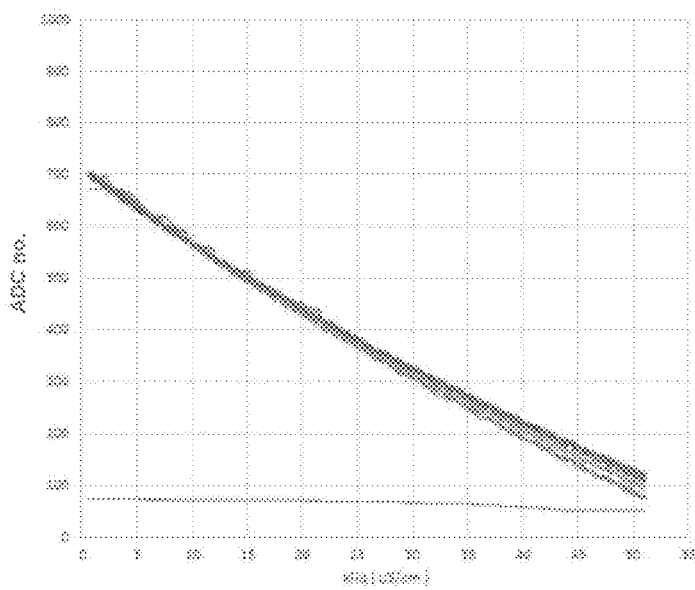
FIG. 10 shows a graph of the variation in the digitised output voltage as a function of the change in the conductivity of the medium, according to a first variant of the second embodiment of the device of the invention.

Lastly, FIG. 10 shows a graph that represents the variation in the output voltage, Vout, after digitisation, as a function of the change in the conductivity of the medium (600), according to a second embodiment of the device of the invention as shown in FIG. 7d.

In this graph it can be seen how a linearity occurs in the output signal, Vout, such that the relationship between the change in conductivity of the medium (600) and the variation in the output voltage is linear. With this, it can be seen that for high values in the conductivity of the medium (600), the change in voltage can still be measured by avoiding the non-linear curves produced.

The different lines of the graph correspond to the lines obtained according to the time interval between switching and sampling, that is, by modifying the time in which the voltage Vout is measured at the output node after injecting the current into the medium (600), as illustrated in FIG. 2.

The invention claimed is:

1. A device for measuring electrical conductivity comprising:
  a first electrode (700a) and a second electrode (700b), both electrodes (700a, 700b) being configured to be introduced into a medium (600) for measuring the electrical conductivity of said medium (600);
  a current source (100) configured to inject an electrical current into the medium (600), and;
  a switching block (200) configured to produce a flow of current through the medium (600) from the first electrode (700a) to the second electrode (700b) or from the second electrode (700b) to the first electrode (700a);
  a sensor block (300) connected to the first electrode (700a) and/or the second electrode (700b), configured to amplify an electrical magnitude of the medium (600) generated in response to the current flow in the medium (600), and;
  a feedback block (400) configured to connect the sensor block (300) to the current source (100);
  wherein the device is configured to, via feedback of the voltage from the output of the sensor block (300) to the current source (100), inject an electrical current into the medium (600) the current intensity value of which is inversely proportional to the electrical conductivity of the medium (600), such that the output voltage of the sensor block (300) varies linearly with the conductivity.

2. The device for measuring electrical conductivity according to claim 1, wherein the current source (100) is configured to inject current into the medium (600) through the first electrode (700a), and wherein the second electrode (700b) is connected to ground through a decoupling capacitor (C1).

3. The device for measuring electrical conductivity according to claim 1, wherein the switching block (200) comprises a switch(S), configured to be controlled by a microcontroller, and wherein one of the poles of said switch (S) is connected to ground.

4. The device for measuring electrical conductivity according to claim 3, wherein one of the poles of the switch(S) is connected to ground through a discharge resistor (Rdisch).

5. The device for measuring electrical conductivity according to claim 3, wherein the switch(S) of the switching block (200) is configured to:
  adopt a first configuration, in which the switch(S) establishes a connection between the current source (100) and the first electrode (700a), and;
  adopt a second configuration, in which the switch disconnects the first electrode (700a) from the current source (100) and establishes a connection between the first electrode (700a) and ground.

6. The device for measuring electrical conductivity according to claim 3, wherein the switch(S) is connected to ground in parallel to the medium (600) and in series with a discharge resistor (Rdisch) of a value lower than the equivalent resistor (Rmedium) of the medium (600).

7. The device for measuring electrical conductivity according to claim 6, wherein the sensor block (300) has a resistive voltage divider connected to its input, formed by two resistors (Rdiv1, Rdiv2), such that a reference voltage is imposed at the input of the sensor block (300) that is proportional to a supply voltage ($V_{DC}$) of the current source (100).

8. The device for measuring electrical conductivity according to claim 1, comprising a filter block (500) connected between the sensor block (300) and the feedback block (400), wherein the filter block (500) is configured to stabilise the voltage at the output of the sensor block (300).

9. The device for measuring electrical conductivity according to claim 8, wherein the filter block (500) comprises an RC filter.

10. The device for measuring electrical conductivity according to claim 9, wherein the filter block (500) comprises at least one first RC branch in parallel with the RC filter.

11. The device for measuring electrical conductivity according to claim 10, wherein the sensor block (300) comprises a non-inverting amplification step formed by an operational amplifier in parallel with a compensation capacitor.

12. The device for measuring electrical conductivity according to claim 1, wherein the current source (100) comprises a first operational amplifier (U1) connected to a first transistor (Q1) through a polarisation resistor (Rbase), wherein the non-inverting input of the first operational amplifier (U1) is connected to the feedback block (400).

13. The device for measuring electrical conductivity according to claim 1, wherein the current source (100) comprises a current mirror.

14. The device for measuring electrical conductivity according to claim 1, wherein the switching block (200) comprises a parallel resistor (Rpar) connected in parallel with the switch(S).

15. The device for measuring electrical conductivity according to claim 1, wherein the current source (100) comprises a second current range switching module (100').

*    *    *    *    *